United States Patent [19]
Takeuchi

[11] 3,886,893
[45] June 3, 1975

[54] APPARATUS FOR APPLYING WAX TO THE SIDE SURFACES OF VEHICLES

[76] Inventor: Shigeo Takeuchi, 2, Kiba-cho, Minato-ku, Nagoya, Japan

[22] Filed: Aug. 30, 1973

[21] Appl. No.: 393,136

[30] Foreign Application Priority Data
Nov. 27, 1972  Japan............... 47-117935

[52] U.S. Cl. .............. 118/2; 118/8; 118/316; 118/323
[51] Int. Cl. ............................................ B05c 5/00
[58] Field of Search ............ 118/2, 8, 323, 316, 73, 118/315; 134/45, 123

[56] References Cited
UNITED STATES PATENTS
| | | | |
|---|---|---|---|
| 2,083,634 | 6/1937 | Brackett | 118/316 |
| 2,840,037 | 6/1958 | Verba | 118/315 |
| 3,255,037 | 6/1966 | Knight et al. | 118/2 X |

Primary Examiner—Dorsey Newton

[57] ABSTRACT

An apparatus capable of applying wax to the side surfaces of a vehicle in an automatic and uniform manner irrespective of the width of the vehicle and without smearing the side windows thereof. It comprises, among others, a guide rail laid on the ground in a position adjacent to one of the side columns of the portal structure for guiding vehicles therethrough and a pair of right and left wax-gun supporting frames, one fixed to the portal structure and the other movable transversely thereof under the control of a sensor mounted on the support frame to feel the adjacent side surface of the vehicle being advanced. Wax guns mounted on the respective support frames with their orifices directed horizontally are each oscillatable about a vertical axis and held spaced a predetermined distance from the vehicle irrespective of the size thereof.

1 Claim, 3 Drawing Figures

APPARATUS FOR APPLYING WAX TO THE SIDE SURFACES OF VEHICLES

BACKGROUND OF THE INVENTION

This invention relates to apparatus for applying wax to the surfaces of vehicles, freshly washed and dried, and particularly to the side surfaces of such vehicles, excepting the surfaces of the side windows thereof, in an automatic and uniform manner for a subsequent polishing operation upon the vehicle sides.

SUMMARY OF THE INVENTION

The present invention has for its object the provision of a new and improved apparatus of the kind described which is capable of applying wax to the side surfaces of vehicles in an automatic and uniform manner irrespective of the size of the vehicles and without smearing the side windows thereof with wax.

According to the present invention, the wax applying apparatus comprises a portal frame structure through which vehicles can progress, a guide rail laid on the ground in a position adjacent to one side of the portal frame structure to guide vehicles therethrough, and a wax ejecting system including wax guns arranged on the opposite sides of the portal frame structure in such a manner as to be held at all times spaced a predetermined distance from the respective side surfaces of a vehicle being advanced, irrespective of the size of the vehicle and more particularly of the width thereof. The wax guns are mounted on respective vertical rods with their orifices directed substantially horizontally and are oscillatable about the axes of the vertical rods in a direction back and forth of the vehicle so that wax may be sprayed uniformly to the opposite side surfaces of the vehicle along substantially straight horizontal lines thereon without any danger of smearing the side windows of the vehicle. The present invention will be described hereinafter in more detail with reference to the accompanying drawings.

DESCRIPTION OF THE PREFERRED EMBODIMENT

Figure 1:
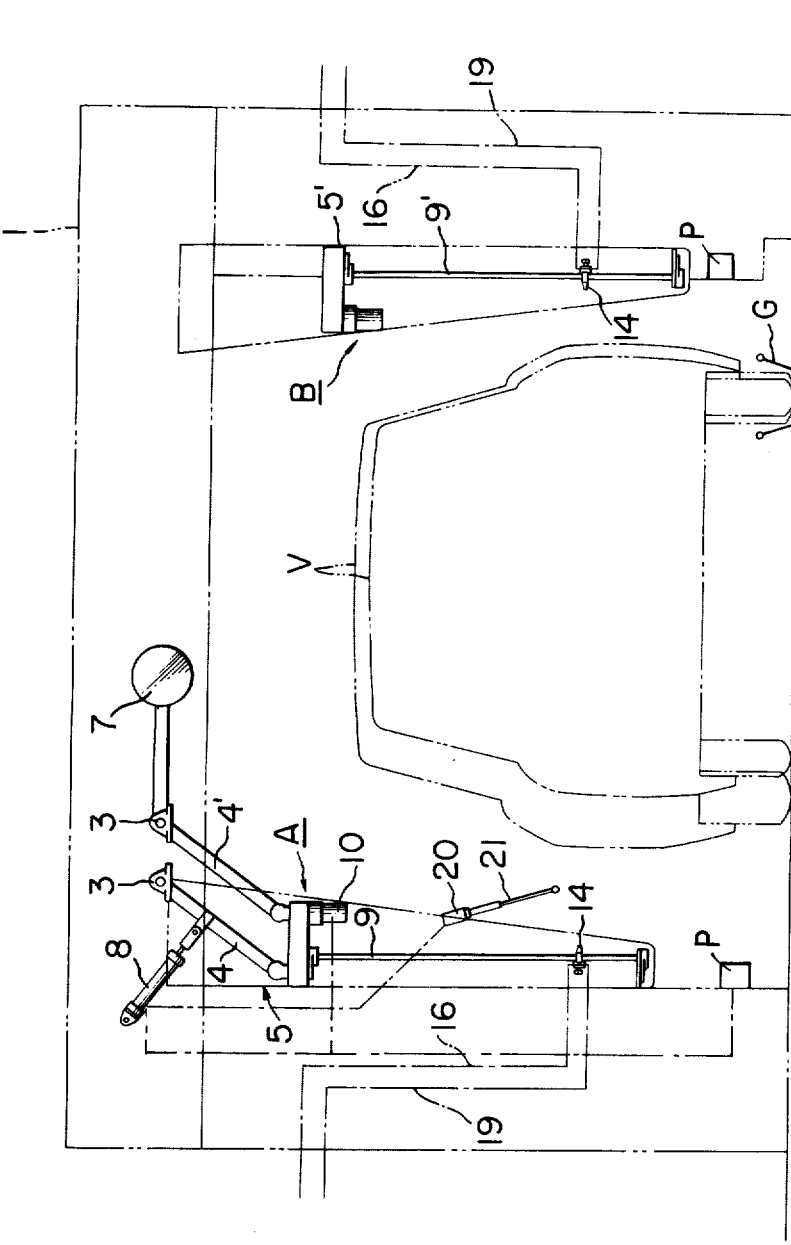
FIG. 1 is a front elevational view, partly schematic, of a preferred embodiment of the present invention.

Referring to the drawings and first to FIG. 1, reference numeral 1 indicates a portal frame structure of the illustrated wax applying apparatus and reference character G indicates a guide rail laid on the ground under the portal frame structure 1 in a position adjacent to one of the side columns thereof and extending at right angles to the plane of the portal frame to serve the purpose of guiding a vehicle V therethrough. As shown, two wax applicators A and B are arranged on the right- and left-hand side portions of the portal frame 1. Description will next be made of the construction of the left-hand side wax applicator A, which is remote from the guide rail G.

Figure 2:
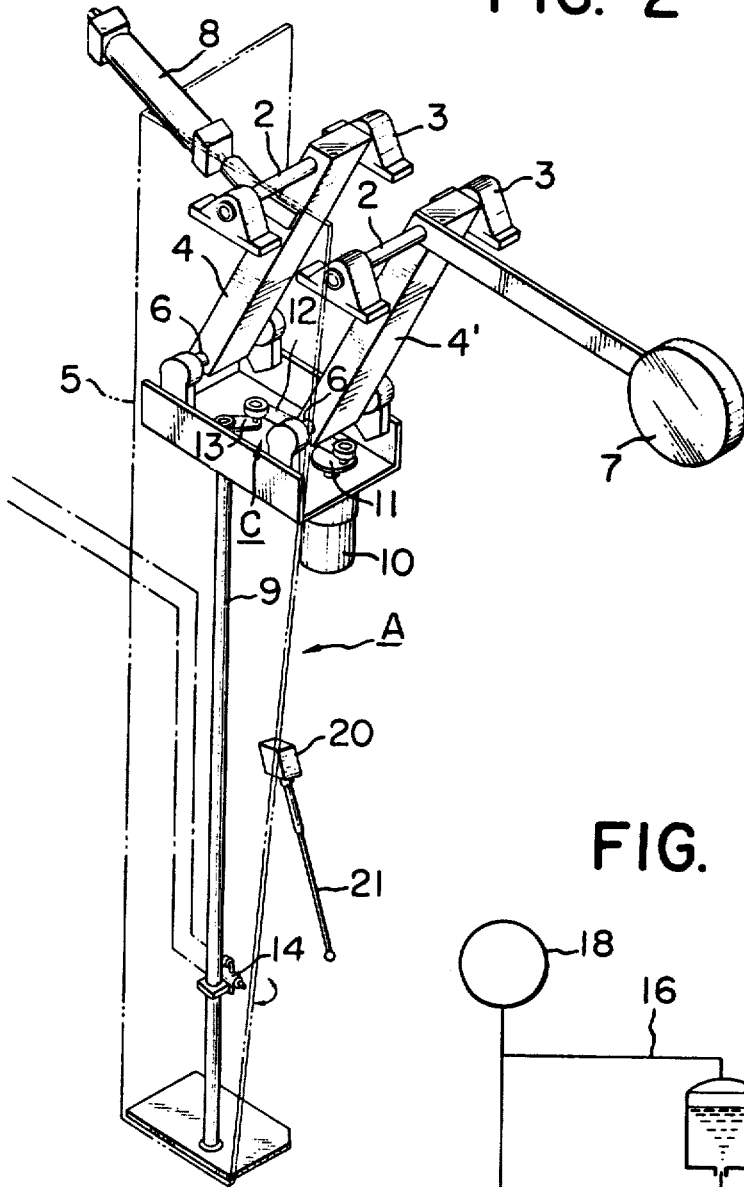
FIG. 2 is a fragmentary perspective view of the same.

Referring also to FIG. 2, the wax applicator A includes a pair of support shafts 2 journaled on the portal frame 1 by bearing means 3 and extending horizontally in spaced parallel relation to each other. A pair of parallel links 4 and 4' are secured at the top to the respective support shafts 2 and pivotally connected at the bottom to a pair of parallel horizontally extending shafts 6, which are fixedly mounted on a support frame 5. As will readily be observed, the arrangement described in effect forms a parallel link mechanism or a pantograph serving to hang the support frame 5 on the portal frame 1 for translatory swinging movement in a lateral direction.

Firmly secured to one of the parallel links, 4', is a counterweight 7 which serves to urge the parallel links 4 and 4' to swing laterally outwardly of the portal frame 1 together with the support frame 5. A pneumatic or other actuator 8 is pivotally secured at its base end to the portal frame 1 and connected at its distal end with the other link 4. As will readily be understood, the actuator 8 when extended acts to cause the parallel links 4 and 4' to swing inwardly of the portal frame 1 together with the support frame 5 against the bias of counterweight 7.

Journaled on the support frame 5 is a vertically extending support rod 9 which is operatively associated at the top with a drive motor 10, fixedly mounted on a top portion of the support frame 5, through a crank mechanism C for rocking movement about its own axis through a predetermined angle. The crank mechanism C is comprised of a disc 11 fixedly mounted on the output shaft of drive motor 10, a crank arm 13 secured to the top end of vertical support rod 9, and a connecting link 12 pivotally connected at the opposite ends thereof with the disc 11 at a definite radial location thereon and with the distal end of crank arm 13. Forming part of the wax ejecting system W of the apparatus, a wax gun 14 is fixedly mounted on a lower portion of the vertical support rod 9 with its orifices directed substantially horizontally.

Figure 3:
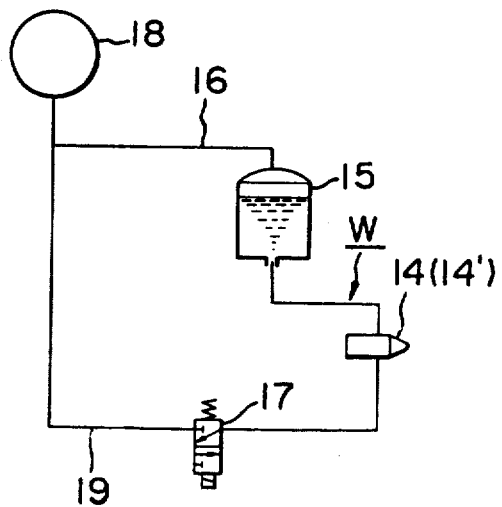
FIG. 3 is a diagrammatic representation of the wax ejecting system of the apparatus shown in FIGS. 1 and 2.

As shown in FIG. 3, the wax ejecting system W is comprised of a source of pressure air supply 18, a wax supply line 16 including a wax reservoir 15 and continuously feeding the wax gun 14 with wax under pressure, and a pressure air supply line 19 including an electromagnetic solenoid valve 17 for feeding the wax gun 14 with pressure air from the air supply source 18 under the control of the electromagnetic valve 17 thereby to control a valve incorporated in the wax gun 14 itself.

The support frame 5 includes a laterally extending vertical plate on which sensor means such as a limit switch 20 is mounted, including a feeler rod 21 extending downwardly and inwardly therefrom for contacting engagement with the adjacent surface of the vehicle V. As will be described later, the output of the sensor 20 is utilized to control the pneumatic actuator 8.

Referring again to FIG. 1, reference character B indicates another wax applicator, which is fixedly arranged on that side of the portal frame 1 which is adjacent to the guide rail G in a position opposite to the above-described wax applicator A. The arrangement and construction of the wax applicator B is substantially the same as that of wax applicator A except that, in the former, B, the support frame 5' carrying a wax gun 14' is directly fixed to the portal frame 1 and lacks any sensor means such as indicated at 20. It is to be understood that the wax gun 14' is inserted in the wax ejecting system W just like the wax gun 14 of wax applicator A and operable together with the latter under the control of electromagnetic valve 17.

Phototube means P are provided on the opposite sides of portal frame 1 to serve the purpose of detecting any vehicle advancing therein and are operable to energize the pneumatic actuator 8.

Description will next be made of the operation of the apparatus described above. First, when a vehicle V is advanced into the frame 1 along the guide rail G, the pneumatic actuator 8 is extended under the control of the phototube means, now sensing the entry of vehicle V in the frame 1, thereby to cause the parallel links 4 and 4' to swing inwardly together with the support frame 5 while at the same time the electromagnetic valve 17 in the wax ejecting system W is opened by phototube means P to start wax ejection through the wax guns 14 and 14'. Subsequently, as the feeling rod 21 comes into contact with the adjacent front fender surface of vehicle V, the sensor 20 starts to operate to control the pneumatic actuator 8 in such a manner that the wax gun 14 is held spaced a predetermined distance from the adjacent side surface of the vehicle V. The operation of the pneumatic actuator 8 under the control of sensor 20 is as follows:

When the pressure of contact between the feeler rod 21 and the vehicle surface exceeds a predetermined value, the air pressure previously fed in the pneumatic actuator 8 is released to the atmosphere, allowing it to retract. On the other hand, when the feeler rod 21 is separated from the vehicle surface, the pneumatic actuator 8 is again fed with pressure air and extended. This means that, as the feeler rod 21 is alternately brought into and out of contact with the side surface of the vehicle being advanced, the sensor 20 operates alternately to extend and retract the pneumatic actuator 8 thereby to keep the wax gun 14 spaced a predetermined distance from the vehicle surface.

It is to be noted that the vertical rod 9 carrying wax gun 14 is driven by the motor 10 through the medium of crank mechanism C to rock about its own axis through a predetermined angle and in this manner wax is sprayed uniformly against the vehicle surface through the wax gun 14 as its nozzle orifice directed horizontally inward is oscillated back and forth.

In other words, as vehicle V progresses through the portal frame structure 1, the wax gun 14 of wax applicator A is driven to oscillate back and forth along the vehicle while maintaining a predetermined distance from the adjacent side surface thereof so that wax is sprayed uniformly against the vehicle surface substantially along a straight line extending horizontally over the top portion of the front fender surface, the side surface immediately beneath the side window or windows and the top portion of the rear fender surface, and flows down along these surfaces to coat them in a substantially uniform manner, irrespective of the transverse size or width of the vehicle V.

As will readily be understood, the wax gun 14' of the other wax applicator B fixedly arranged adjacent to the guide rail G is also oscillated back and forth in quite the same manner as the wax gun 14 to apply wax to the adjacent side surface of the vehicle V, which includes the front fender surface, the surface beneath the side window or windows and the rear fender surface of the vehicle side. In this connection, it is to be noted that the distance between the wax gun 14' and the adjacent side surface of the vehicle remains substantially unchanged irrespective of the size of the vehicle as it is advanced with its wheels on the adjacent side guided along the guide rail G.

As the vehicle V passes away from the portal frame 1, the phototube means P act to de-energize the pneumatic actuator 8, allowing the parallel links 4 and 4' to swing back outwardly under the effect of counterweight 7 thereby to restore the support frame 5 to its normal, retracted position shown in FIG. 1. Simultaneously with this, the power drive of motor 10 is interrupted and the electromagnetic valve 17 is closed by phototube means P to complete the whole cycle of wax-applying operation.

As will be apparent from the foregoing description, the apparatus according to the present invention comprises wax guns adapted to be held at all times spaced a predetermined distance from the side surfaces of a vehicle being advanced irrespective of the size thereof and is thus capable of applying wax to the painted side surfaces of the vehicle, including the front fender surfaces, the surfaces beneath the side windows and the rear fender surfaces, in an automatic and uniform manner without any danger of contaminating or smearing the side windows of the vehicle with wax. It will readily be appreciated that such painted vehicle surfaces, once wax has been applied thereto in the manner described, can subsequently be polished efficiently and uniformly to any desired luster by a buffing operation, for example, employing cylindrical rotary buffs.

While only one preferred embodiment of the present invention has been shown and described, it will be apparent to those skilled in the art that many changes and modifications may be made therein without departing from the spirit and scope of the claimed invention.

I claim:

1. An apparatus for applying wax to the side surfaces of vehicles, comprising: a portal frame structure through which a vehicle can progress, a guide rail laid on the ground under said portal frame structure in a position adjacent to one side thereof to guide the vehicle through said portal frame structure, a wax ejecting system including a pair of wax guns arranged on the opposite side portions of said portal frame structure and having respective orifices directed substantially horizontally and inwardly of said portal frame structure, a first support frame secured to said portal frame structure on that side thereof adjacent to said guide rail, a second support frame hung on said portal frame structure on the opposite side thereof through the intermediary of a parallel link mechanism, two vertical rods journaled on said respective support frames for oscillation about their own axes and respectively supporting said wax guns at substantially the same level, biasing means for normally urging said second support frame to swing outwardly of said portal frame structure, actuator means coupled to said wax ejecting system to operate the same and including a pneumatic actuator operable to cause said second support frame to swing inwardly of said portal frame structure against the bias of said biasing means, sensor means arranged on said second support frame to sense the adjacent side surface of the vehicle progressing through said portal frame structure and operable to control said pneumatic actuator in a manner so that the wax gun associated with said second support frame is held at all times spaced a predetermined distance from the adjacent side surface of the vehicle, and drive means associated with said vertical rods to cause oscillatory rotation thereof about their own axes.

* * * * *